United States Patent
Iwata et al.

[11] Patent Number: 5,881,552
[45] Date of Patent: Mar. 16, 1999

[54] CONTROL SYSTEM FOR INTERNAL COMBUSTION ENGINES AND CONTROL SYSTEM FOR VEHICLES

[75] Inventors: Yoichi Iwata; Akira Katoh; Toshikazu Oketani; Tetsu Teshirogi; Kentaro Yokoo; Naoki Iida; Yoshihisa Hara, all of Wako, Japan

[73] Assignee: Honda Giken Kogyo Kabushiki Kaisha, Tokyo, Japan

[21] Appl. No.: 670,409

[22] Filed: Jun. 25, 1996

[30] Foreign Application Priority Data

Jun. 28, 1995 [JP] Japan ..................... 7-183261

[51] Int. Cl.$^6$ .............. F01N 3/20; F16H 59/74
[52] U.S. Cl. .................. 60/284; 60/285; 477/100
[58] Field of Search ............. 60/284, 285, 274; 123/418, 421, 424; 477/127, 155, 97, 100

[56] References Cited

U.S. PATENT DOCUMENTS

| | | | |
|---|---|---|---|
| 3,895,541 | 7/1975 | Nohira et al. | 477/97 |
| 3,918,257 | 11/1975 | Hirose et al. | 60/284 |
| 4,144,853 | 3/1979 | Maruoka et al. | 60/285 |
| 5,211,011 | 5/1993 | Nishikawa et al. | 60/284 |
| 5,307,626 | 5/1994 | Maus et al. | 60/285 |
| 5,501,073 | 3/1996 | Miyashita et al. | 60/284 |
| 5,535,586 | 7/1996 | Ohta et al. | 60/285 |
| 5,566,546 | 10/1996 | Rumpsa et al. | 60/285 |
| 5,634,868 | 6/1997 | Weber et al. | 60/285 |

FOREIGN PATENT DOCUMENTS

55-160136  12/1980  Japan .

*Primary Examiner*—Willis R. Wolfe
*Attorney, Agent, or Firm*—Nikaido, Marmelstein, Murray & Oram LLP

[57] ABSTRACT

A control system for an internal combustion engine has a catalyst arranged in the exhaust system, for purifying exhaust gases emitted from the engine. An ECU controls operation of the engine, based on at least one predetermined control parameter, and detects a temperature state of the catalyst at the start of the engine. The at least one predetermined control parameter is changed, based on the detected temperature state of the catalyst, after the start of the engine.

5 Claims, 9 Drawing Sheets

FIG.1

SOAKING TIME PERIOD

CONTROL SYSTEM FOR INTERNAL COMBUSTION ENGINES AND CONTROL SYSTEM FOR VEHICLES

BACKGROUND OF THE INVENTION

1. Field of the Invention

This invention relates to a control system for internal combustion engines, which controls the operation of the engine such as the ignition timing of the engine and the intake air amount supplied to the engine, based on control parameters including engine temperature-dependent control parameters, and also to a control system for vehicles, which controls the operation of an internal combustion engine and/or the operation of a transmission of a vehicle in which the engine is installed, based on control parameters including engine temperature-dependent control parameters.

2. Prior Art

There is conventionally known a method of controlling an internal combustion engine, for example, from Japanese Laid-Open Patent Publication (Kokai) No. 55-160136, in which immediately after the start of the engine, a desired idling rotational speed of the engine is determined according to engine coolant temperature, and the intake air amount is controlled in a feedback manner responsive to a difference between the desired idling rotational speed and the actual idling rotational speed such that the actual idling rotational speed becomes equal to the desired idling rotational speed. According to the known method, when the engine coolant temperature is below a predetermined value, e.g. 60° C., the desired idling rotational speed is set to larger values as the engine coolant temperature lowers.

Figure 1:
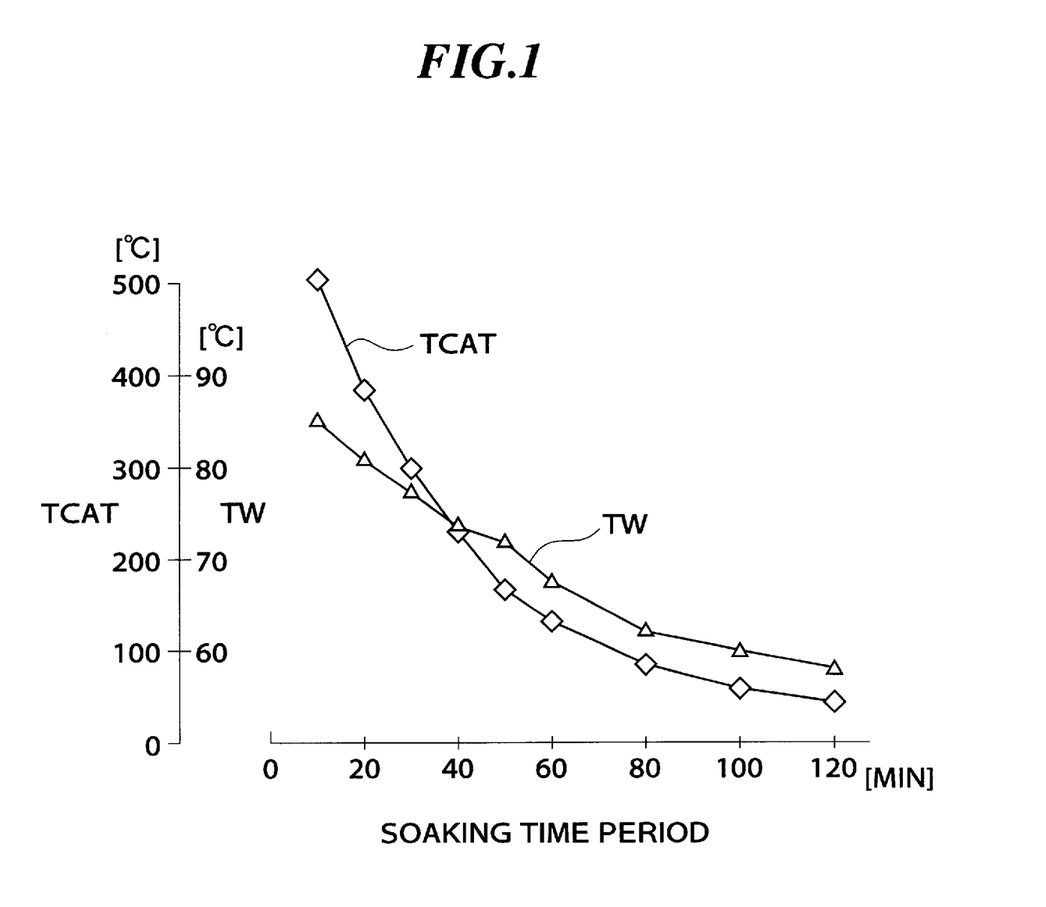
FIG. 1 is a graph showing the relationship between the catalyst temperature and the engine coolant temperature, plotted with the lapse of soaking time period.

However, the conventional known method has the following problem:

That is, a rate of decrease in the temperature TCAT of a catalytic converter (catalyst) arranged in the exhaust system of an internal combustion engine with the lapse of time after stoppage of the engine is larger than a normal rate of decrease in the engine coolant temperature TW, as shown in FIG. 1. Therefore, for example, when about one hour has elapsed after stoppage of the engine, the catalyst temperature considerably drops, while the engine coolant temperature has not dropped to the same level as the catalyst temperature. On this occasion, if the engine is restarted, the desired idling rotational speed, which is set based on the engine coolant temperature, is set to a relatively low value. As a result, the catalyst temperature rises at a low rate, leading to degraded exhaust emission characteristics of the engine. A state in which the engine is held in stoppage for a short time period as long as one hour or so after stoppage of the engine will be referred to as "short soaking" in the present specification.

SUMMARY OF THE INVENTION

It is the object of the invention to provide a control system for internal combustion engines and a control system for vehicles, which is capable of improving exhaust emission characteristics of the engine at restart of the engine after short soaking.

To attain the above object, in a first aspect, the present invention provides a control system for an internal combustion engine having an exhaust system, and catalyst means arranged in the exhaust system, for purifying exhaust gases emitted from the engine, comprising:

control means for controlling operation of the engine, based on at least one predetermined control parameter;

catalyst temperature state-detecting means for detecting a temperature state of the catalyst means at start of the engine; and control parameter-changing means for changing the at least one predetermined control parameter, based on the temperature state of the catalyst means detected by the catalyst temperature state-detecting means, after the start of the engine.

Preferably, the catalyst temperature state-detecting means comprises soaking time-measuring means for measuring a time period elapsed from stoppage of the engine to next start of the engine.

More preferably, the catalyst temperature state-detecting means comprises soaking time-measuring means for measuring a time period elapsed from stoppage of the engine to next start of the engine, and catalyst temperature-estimating means for estimating temperature of the catalyst means, based on the time period measured by the soaking time-measuring means.

Alternatively, the catalyst temperature state-detecting means comprises catalyst temperature-detecting means provided in the catalyst means, for detecting temperature of the catalyst means.

Advantageously, the control parameter-changing means comprises ignition timing control means for retarding ignition timing of the engine according to the temperature state of the catalyst means detected by the catalyst temperature state-detecting means.

Alternatively or together with the ignition timing control means, the control parameter-changing means comprises idling rotational speed control means for increasing idling rotational speed of the engine according to the temperature state of the catalyst means detected by the catalyst temperature state-detecting means.

To attain the object, in a second aspect, the present invention provides a control system for a vehicle having a plurality of driving wheels, an internal combustion engine installed therein, and transmission means for transmitting a driving force of the engine to the driving wheels, the engine having an exhaust system, and catalyst means arranged in the exhaust system, for purifying exhaust gases emitted from the engine, the control system comprising:

control means for controlling at least one of operation of the engine and operation of the transmission means, based on at least one predetermined control parameter;

catalyst temperature state-detecting means for detecting a temperature state of the catalyst means at start of the engine; and control parameter-changing means for changing the at least one predetermined control parameter, based on the catalyst temperature state detected by the catalyst temperature state-detecting means, after the start of the engine.

Preferably, the catalyst temperature state-detecting means comprises soaking time-measuring means for measuring a time period elapsed from stoppage of the engine to next start of the engine.

More preferably, the catalyst temperature state-detecting means comprises soaking time-measuring means for measuring a time period elapsed from stoppage of the engine to next start of the engine, and catalyst temperature-estimating means for estimating temperature of the catalyst means, based on the time period measured by the soaking time-measuring means.

Alternatively, the catalyst temperature state-detecting means comprises catalyst temperature-detecting means provided in the catalyst means, for detecting temperature of the catalyst means.

Advantageously, the control parameter-changing means comprises ignition timing control means for retarding ignition timing of the engine according to the temperature state of the catalyst means detected by the catalyst temperature state-detecting means.

Alternatively or together with the ignition timing control means, the control parameter-changing means comprises idling rotational speed control means for increasing idling rotational speed of the engine according to the temperature state of the catalyst means detected by the catalyst temperature state-detecting means.

The control parameter-changing means may also comprise transmission control means for increasing a shifting point of the transmission means according to the temperature state of the catalyst means detected by the catalyst temperature state-detecting means.

The above and other objects, features and advantages of the invention will become more apparent from the following detailed description taken in conjunction with the accompanying drawings.

DETAILED DESCRIPTION

The invention will now be described in detail with reference to the drawings showing embodiments thereof.

Figure 2:
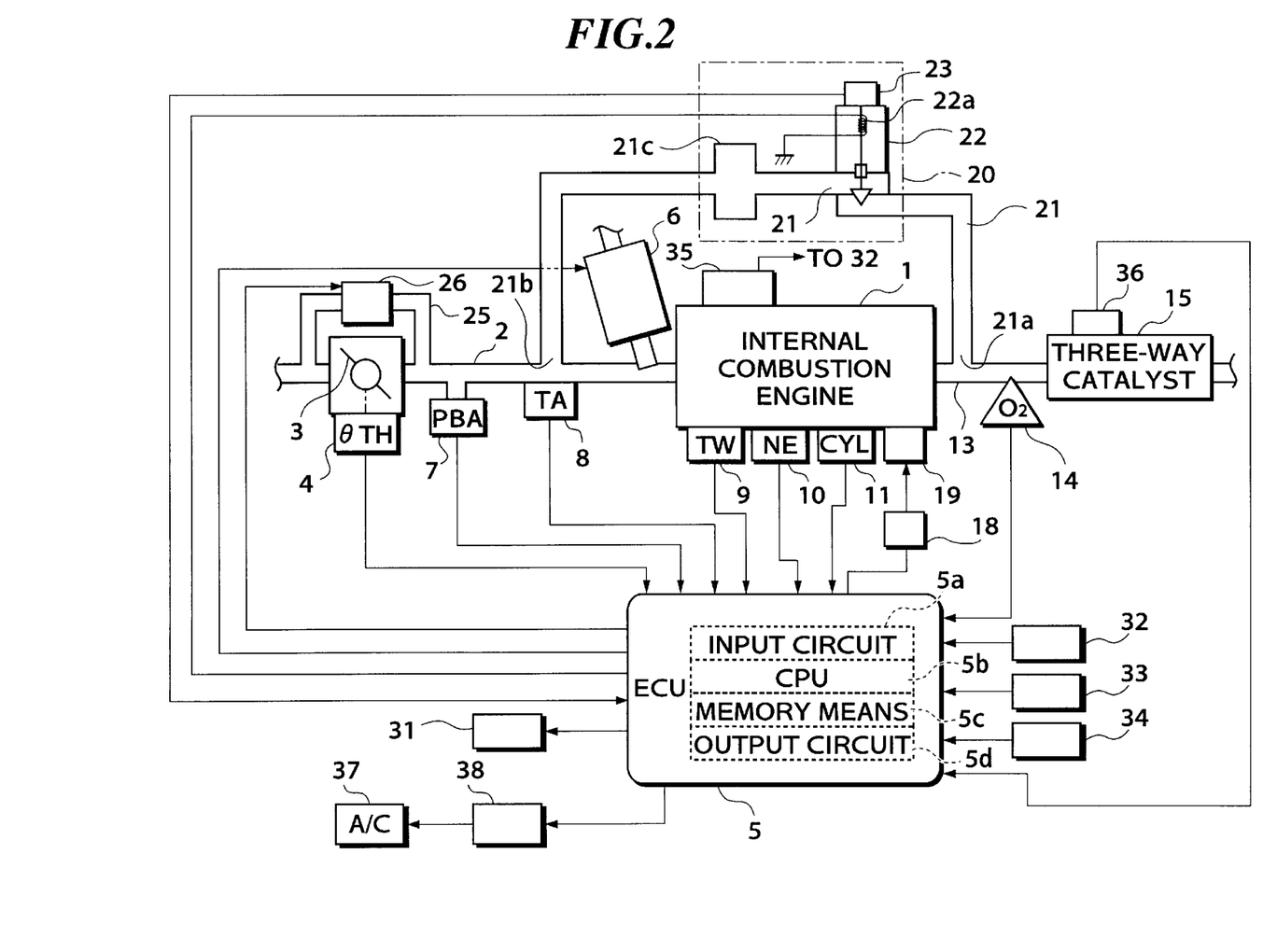
FIG. 2 is a block diagram schematically showing the whole arrangement of a control system for an internal combustion engine installed in a vehicle and for the vehicle, according to a first embodiment of the invention.

Referring first to FIG. 2, there is illustrated the whole arrangement of a control system for an internal combustion engine (hereinafter simply referred to as "the engine") installed in a vehicle and for the vehicle, according to a first embodiment of the invention.

In the figure, reference numeral 1 designates an internal combustion engine which drives driving wheels of the vehicle via a transmission 35. The engine 1 has an intake pipe 2 connected to a cylinder block thereof, in which a throttle valve 3 is arranged. A throttle valve opening ($\theta$TH) sensor 4 is connected to the throttle valve 3, for generating an electric signal indicative of the sensed throttle valve opening $\theta$TH to an electronic control unit (hereinafter referred to as "the ECU") 5.

Fuel injection valves 6, only one of which is shown, are inserted into the intake pipe 2 at locations intermediate between the cylinder block of the engine 1 and the throttle valve 3 and slightly upstream of respective intake valves, not shown. The fuel injection valves 6 are connected to a fuel pump, not shown, and electrically connected to the ECU 5 to have their valve opening periods controlled by signals therefrom.

On the other hand, an intake pipe absolute pressure (PBA) sensor 7 is connected to the intake pipe 2 at a location immediately downstream of the throttle valve 3, for sensing absolute pressure (PBA) within the intake pipe 2, and is electrically connected to the ECU 5, for supplying an electric signal indicative of the sensed absolute pressure PBA to the ECU 5. Further, an intake air temperature (TA) sensor 8 is inserted into the intake pipe 2 at a location downstream of the PBA sensor 7, for supplying an electric signal indicative of the sensed intake air temperature TA to the ECU 5.

An engine coolant temperature (TW) sensor 9, which may be formed of a thermistor or the like, is mounted in the cylinder block of the engine 1 which is filled with an engine coolant, for supplying an electric signal indicative of the sensed engine coolant temperature TW to the ECU 5.

An engine rotational speed (NE) sensor 10 and a cylinder-discriminating sensor (hereinafter referred to as "the CYL sensor") 11 are arranged in facing relation to a camshaft or a crank shaft of the engine 1, neither of which is shown. The NE sensor 10 generates a signal pulse (hereinafter referred to as "a TDC signal pulse") at each of predetermined crank angles (e.g. whenever the crankshaft rotates through 180 degrees when the engine is of the 4-cylinder type) which each correspond to a predetermined crank angle before a top dead point (TDC) of each cylinder corresponding to the start of the intake stroke of the cylinder. The CYL sensor 11 generates a signal pulse (hereinafter referred to as "a CYL signal pulse") at a predetermined crank angle of a particular cylinder of the engine 1. The CYL signal pulse and TDC signal pulse are supplied to the ECU 5.

A spark plug 19 is arranged in each cylinder of the engine 1 and electrically connected to the ECU 5 through a distributor 18. In the present embodiment, the transmission 35 is an automatic transmission 35, and a transmission actuator 31 for changing the shift position (reduction gear ratio) of the transmission is electrically connected to the ECU 5.

A three-way catalyst (catalytic converter) 15 is arranged in an exhaust pipe 13 of the engine 1, for purifying noxious components in exhaust gases emitted from the engine 1, such as HC, CO, and NOx. An oxygen concentration sensor (hereinafter referred to as "the O2 sensor") 14 as an air-fuel ratio sensor is arranged in the exhaust pipe 13 at a location upstream of the three-way catalyst 15, which detects the concentration of oxygen present in exhaust gases and supplies an electric signal indicative of the sensed oxygen concentration to the ECU 5.

A bypass passage 25 is provided for the intake pipe 2, which bypasses the throttle valve 3 and has an auxiliary air control valve 26 arranged thereacross. The auxiliary air control valve 26 is an electromagnetic valve which has its valve opening controlled to be linearly changed by a signal from the ECU 5.

Further connected to the ECU 5 are various kinds of sensors, such as a vehicle speed sensor 32 for detecting traveling speed V of the vehicle in which the engine 1 is installed, an accelerator pedal position sensor 34 for detecting a stepping-on amount ACC of an accelerator pedal, not shown, of the vehicle (hereinafter referred to as "the accelerator pedal position"), and switches, such as an ignition switch 33, signals indicative of the sensed parameter values being supplied to the ECU 5. Further, a catalyst temperature sensor 36 is provided in the three-way catalyst 15, for detecting the temperature TCAT of the three-way catalyst 15, an air conditioner 37 driven by the engine 1 is mounted in the vehicle, and a switch 38 for driving the air conditioner 37 is electrically connected to the ECU 5.

The engine 1 is provided with an exhaust gas recirculation (EGR) system 20.

An exhaust gas recirculation passage 21 of the EGR system 20 has one end 21a thereof connected to the exhaust pipe 13 of the engine 1 and the other end 21b thereof connected to the intake pipe 2, respectively. Arranged across the exhaust gas recirculation passage 21 are an exhaust gas recirculation control valve (hereinafter referred to as "the EGR valve") 22 for controlling a flow rate of exhaust gases to be recirculated, and a volumetric chamber 21c. The EGR valve 22 is an electromagnetic valve having a solenoid 22a electrically connected to the ECU 5, and the valve opening (lift) of the EGR valve 22 is controlled to be linearly changed by a signal from the ECU 5. A lift sensor 23 is provided for the EGR valve 22, which detects the valve opening (valve lift) of the EGR valve 22, and a signal indicative of the sensed valve lift is supplied to the ECU 5.

The ECU 5 determines operating conditions of the engine 1, based on engine operating parameters from various sensors including those mentioned above, and supplies a control signal to the solenoid 22a of the EGR valve 22 to make zero a difference between a valve lift command value LCMD of the EGR valve 22, which is set according to the intake pipe absolute pressure PBA and the engine rotational speed NE, and an actual valve lift value LACT of the EGR valve 22, which is detected by the lift sensor 23.

The ECU 5 is comprised of an input circuit 5a having the functions of shaping the waveforms of input signals from various sensors, shifting the voltage levels of sensor output signals to a predetermined level, converting analog signals from analog-output sensors to digital signals, and so forth, a central processing unit 5b (hereinafter referred to as the "the CPU"), memory means 5c storing various operational programs which are executed by the CPU 5b, and for storing results of calculations therefrom, etc., an output circuit 5d which outputs driving signals to the fuel injection valves 6, etc.

The CPU 5b operates in response to signals from various engine operating parameter sensors including those mentioned above to determine operating conditions in which the engine 1 is operating, such as an air-fuel ratio feedback control region in which air-fuel ratio control is carried out in response to oxygen concentration in exhaust gases, and air-fuel ratio open-loop control regions, and calculates, based upon the determined engine operating conditions, a fuel injection period TOUT for each of the fuel injection valves 6, in synchronism with generation of TDC signal pulses, to supply driving signals to the fuel injection valves 6, based on the fuel injection period TOUT thus determined. In the above air-fuel ratio feedback control region, the CPU 5b calculates the fuel injection period TOUT, based on an output from the O2 sensor 14 such that the air-fuel ratio of an air-fuel mixture to be supplied to the engine 1 becomes equal to a stoichiometric air-fuel ratio.

Further, the CPU 5b calculates the ignition timing θIG, the valve opening command value LCMD of the EGR valve 22, and the valve opening of the auxiliary air control valve 26, according to operating conditions of the engine, and calculates the shift position of the transmission 35 according to the vehicle speed V, the accelerator pedal position ACC, the engine rotational speed NE, etc., for generating driving signals based on results of the calculations via the output circuit 5d to drive an ignition device, not shown, the EGR valve 22, and the auxiliary air control valve 26.

Figure 3:
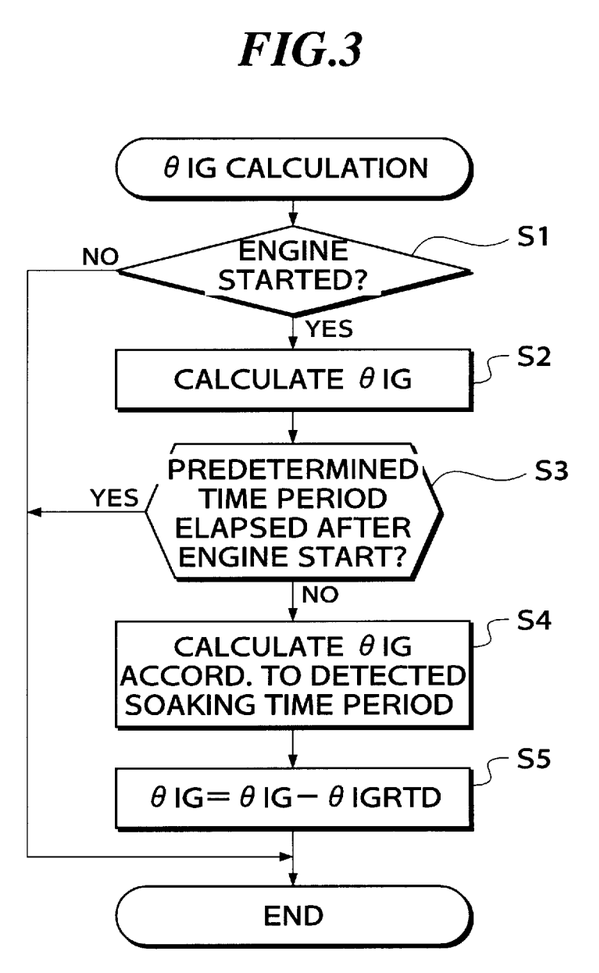
FIG. 3 is a flowchart showing a program for calculating the ignition timing according to the first embodiment.
Figure 4:
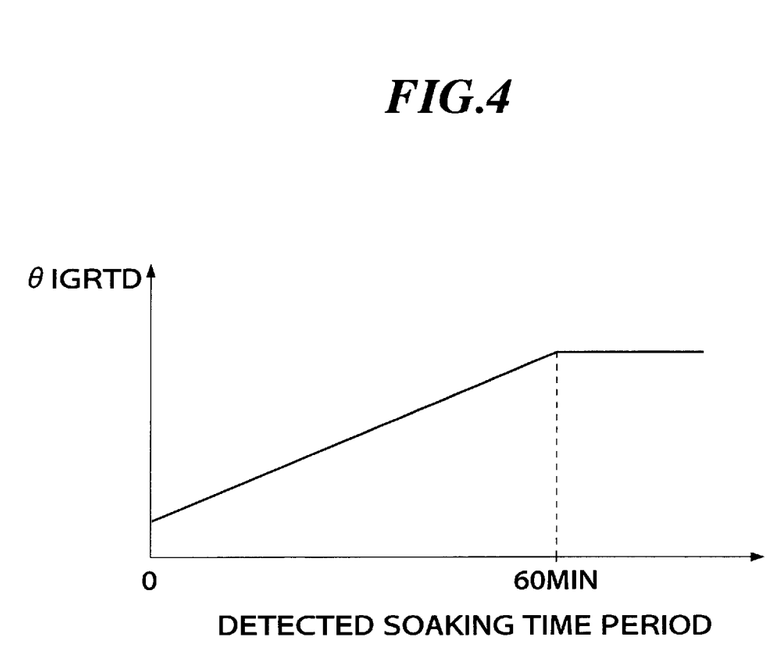
FIG. 4 shows a table for determining an ignition timing retarding amount according to a detected value of the soaking time period.

FIG. 3 shows a program for calculating the ignition timing θIG, which is executed by the CPU 5b. First, at a step S1, it is determined whether or not the engine 1 has been started. If the engine 1 has not been started, the program is immediately terminated. On the other hand, if the engine 1 has been started, the ignition timing θIG is calculated by a known method, based on operating conditions of the engine. Then, it is determined at a step S3 whether or not a predetermined time period has elapsed after the start of the engine. If the predetermined time period has not yet elapsed, a θIGRTD table shown in FIG. 4 is retrieved according to a detected value of the soaking time period, i.e. a time period elapsed from the time the engine operation was stopped last time to the time the engine operation has been started at the present time, to thereby determine a retarding amount θIGRTD of the ignition timing θIG, at a step S4. The θIGRTD table is set, e.g. as shown in FIG. 4, such that the retarding amount θIGRTD is increased as the soaking time period becomes longer insofar as it is less than 60 minutes, while the retarding amount θIGRTD is set to an almost constant value when the soaking time period exceeds 60 minutes. Next, the ignition timing θIG calculated at the step S2 is corrected to a retarded side, based on the retarding amount θIGRTD at a step S5, followed by terminating the present routine.

When the predetermined time period has elapsed after the start of the engine, the answer to the question of the step S3 becomes affirmative (YES), and then the program is immediately terminated without executing the steps S4 and S5.

According to the program of FIG. 3 described above, when the predetermined time period has not elapsed after the start of the engine, the ignition timing θIG is retarded according to the detected value of the soaking time period. Especially, in the case of a short soaking time period, i.e. when the soaking time period of about one hour has elapsed, elevation of the temperature of the three-way catalyst 15 is accelerated by the retardation of the ignition timing according to the present embodiment, to thereby improve exhaust emission characteristics of the engine.

Figure 5A:
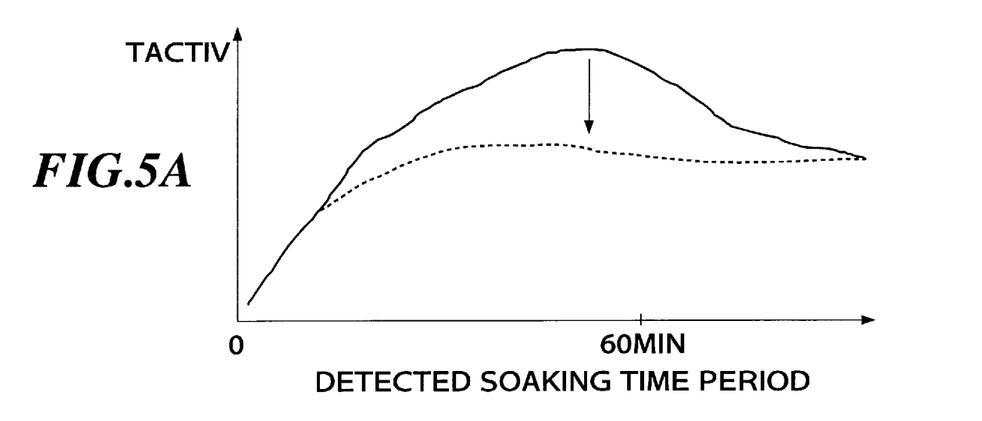
FIG. 5A is a graph showing the relationship between an activation time period TACTIV required for a catalyst to become activated and the soaking time period.
Figure 5B:
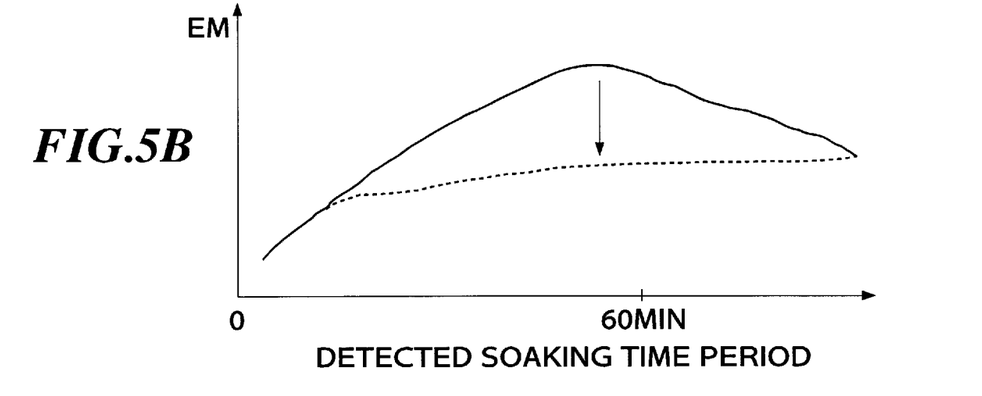
FIG. 5B is a graph showing the relationship between an amount EM of CO, HC, etc. in exhaust gases emitted from the engine and the soaking time period.

FIGS. 5A and 5B more specifically show an example of improvement of exhaust emission characteristics of the engine by the retardation of the ignition timing. FIG. 5A shows the relationship between an activation time period TACTIV required for the three-way catalyst 15 to reach a predetermined temperature, e.g. 350° C. at and above which it becomes activated and the soaking time period, and FIG. 5B shows the relationship between an amount EM of toxic components in exhaust gases such as CO and HC, and the soaking time period. In the figures, the solid lines indicate characteristics obtained according to the conventional system, and the broken lines characteristics obtained according to the present embodiment.

As is clear from these figures, according to the present embodiment, the catalyst temperature is more quickly elevated especially in the case of a short soaking time period, to thereby decrease the amount EM of toxic exhaust gas components, such as CO and HC. The reason why the retarding amount θIGRTD is determined according to the soaking time period, in the present embodiment, is that the soaking time period and the catalyst temperature TCAT are correlated with each other, as shown in FIG. 1. Therefore, the soaking time period can represent a catalyst temperature state indicative of the catalyst temperature TCAT.

Figure 6:
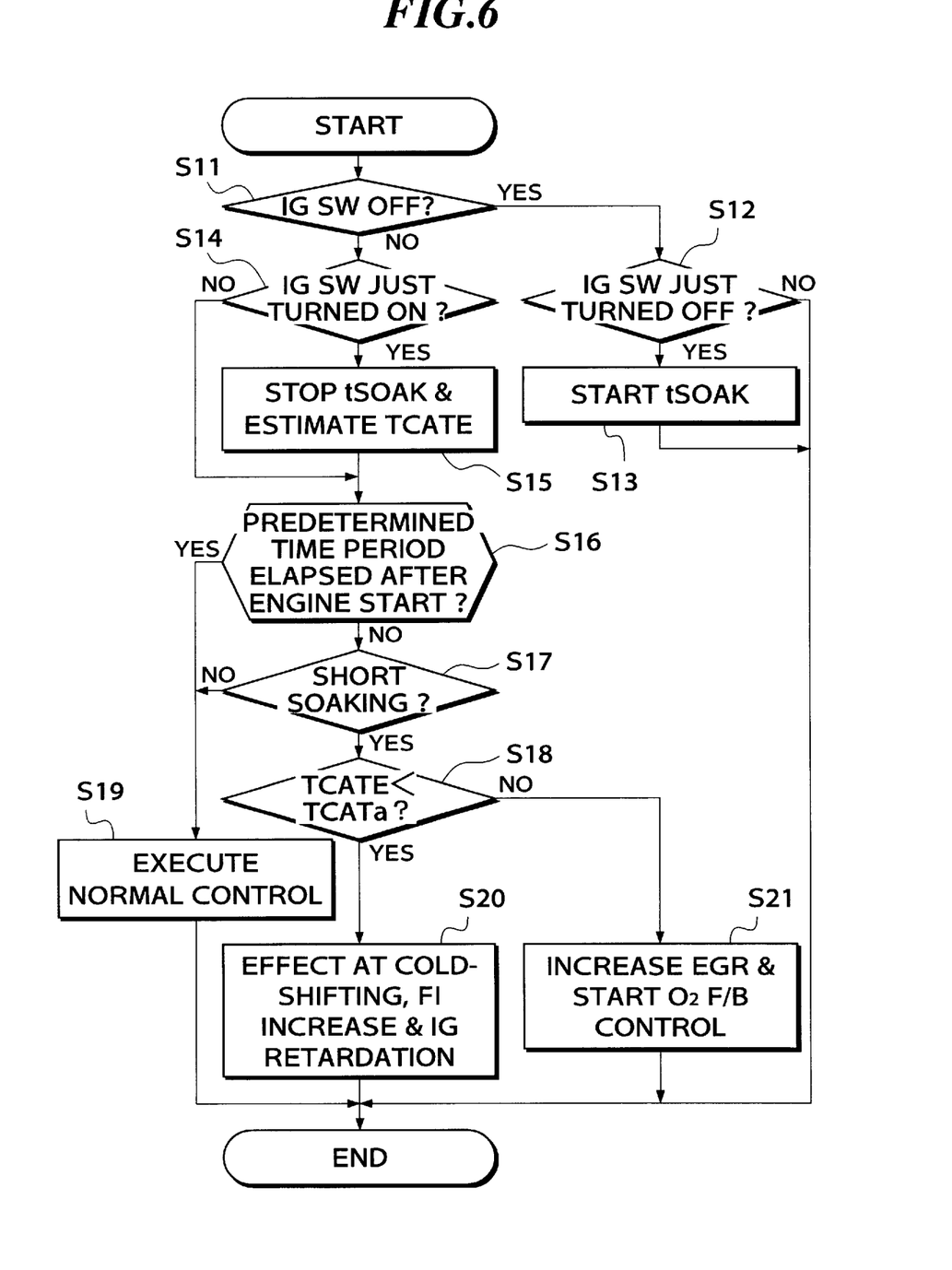
FIG. 6 is a program for controlling an internal combustion engine and an actuator for a transmission of a vehicle in which the engine is installed, according to a second embodiment of the invention.

FIG. 6 shows a program for controlling the operations of the engine 1 and the transmission actuator 31, according to a second embodiment of the invention. The arrangement of the control system according to this embodiment is identical with that according to the first embodiment, description of which is omitted.

First, at a step S11, it is determined whether or not the ignition switch is off. If the ignition switch is off, it is determined at a step S12 whether or not the ignition switch has just been turned off. If the ignition switch has just been turned off, an up-counting timer tSOAK for detecting the soaking time period is started at a step S13. On the other hand, if the ignition switch has not just been turned off, the program is immediately terminated.

Figure 7:
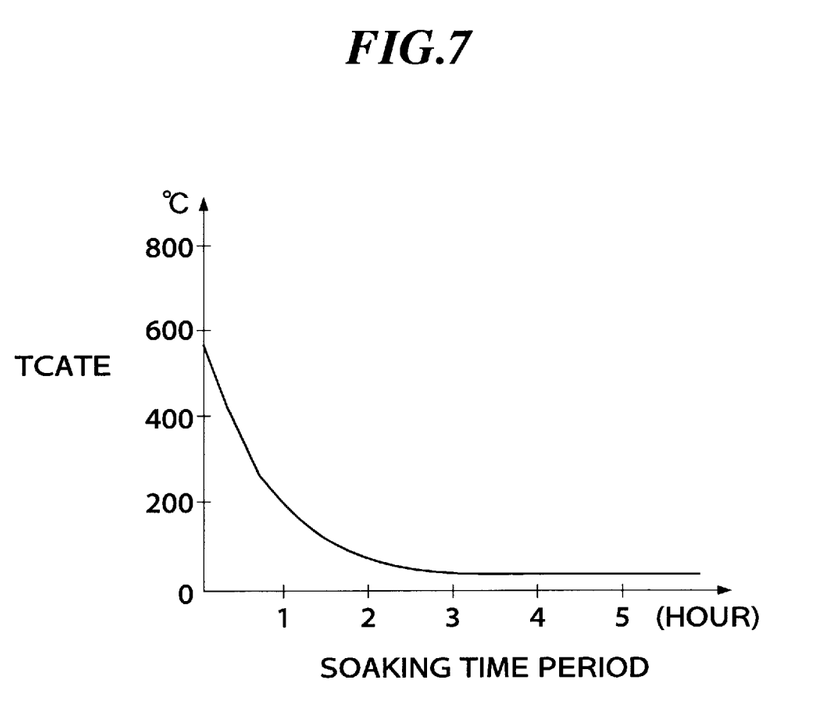
FIG. 7 shows a table for determining an estimated value of the catalyst temperature according to the soaking time period.

On the other hand, if the ignition switch is on, it is determined at a step S14 whether or not it has just been turned on. If it has just been turned on, the timer tSOAK is stopped and at the same time temperature TCAT of the three-way catalyst 15 is estimated according to the count value of the timer tSOAK, i.e. the soaking time period, based on a TCATE table shown in FIG. 7, to thereby determine an estimated temperature TCATE, at a step S15. On the other hand, if the ignition switch has not just been turned on, the program skips over the step S15 to a step S16. The TACTE table of FIG. 7 was prepared based on actually measured values of the catalyst temperature.

At the step S16, it is determined whether or not a predetermined time period has elapsed. If the predetermined time period has not elapsed, then it is determined at a step S17 whether or not the engine was held in stoppage over a short soaking time period, i.e. whether or not the count value of the timer tSOAK falls within a predetermined range. If the answer to the question of the step S16 is affirmative (YES) or the answer to the question of the step S17 is negative (NO), i.e. if the predetermined time period has elapsed after the start of the engine or the engine was not held in stoppage over the short soaking time period, the program proceeds to a step S19, wherein the fuel supply amount, the ignition timing, the exhaust gas recirculation amount, the auxiliary air amount, and the reduction gear ratio of the transmission are controlled in respective normal manners.

On the other hand, if the answer to the question of the step S16 is negative (NO) and at the same time the answer to the question of the step S17 is affirmative (YES), it is determined at a step S18 whether or not the estimated catalyst temperature TCATE is lower than a predetermined value TCATa, and if TCATE <TCATa holds, the gear-shifting characteristic of the transmission is changed to cold shifting, the idling rotational speed is increased by increasing the auxiliary air amount, and the ignition timing θIG is retarded at a step S20. By means of these measures, the elevation of the catalyst temperature is quickened. The cold shifting of the gear-shifting characteristic is changing a predetermined engine rotational speed at which the transmission is to be shifted up to a higher speed gear ratio, to a higher value, whereby the transmission will not easily be shifted up. Thus, the engine rotational speed NE can be increased to a higher value than a value assumed in normal operation, to thereby quicken the elevation of the temperature of the three-way catalyst 15.

If TCATE≧TCATa holds at the step S18, the program proceeds to a step S21, wherein the exhaust gas recirculation amount is increased, and at the same time air-fuel ratio feedback control based on the output from the O2 sensor 14 is started.

As described above, according to the present embodiment, when the predetermined time period has not elapsed after the restart of the engine after the lapse of a short soaking time period, if the catalyst temperature TCATE estimated immediately after turning-on of the ignition switch is lower than the predetermined value TCATa, the cold shifting of the gear-shifting characteristic, the increase in the auxiliary air amount, and the retardation of the ignition timing are carried out to elevate the temperature of the three-way catalyst 15, whereby exhaust emission characteristics of the engine can be improved.

Although in the present embodiment the estimated catalyst value TCATE is compared with the predetermined value TCATa at the step S18, this is not limitative. Alternatively, the count value of the timer tSOAK may be compared with a predetermined time period TSOAKa, whereby if tSOAK>TSOAKa holds, the program proceeds to the step S20.

Further, although in the present embodiment the cold shifting of the gear-shifting characteristic, the increase in the auxiliary air amount, and the retardation of the ignition timing are all carried out to quicken the elevation of the catalyst temperature at the step S20, this is not limitative. Alternatively, one measure or a combination of any two measures thereof may be carried out.

Figure 8:
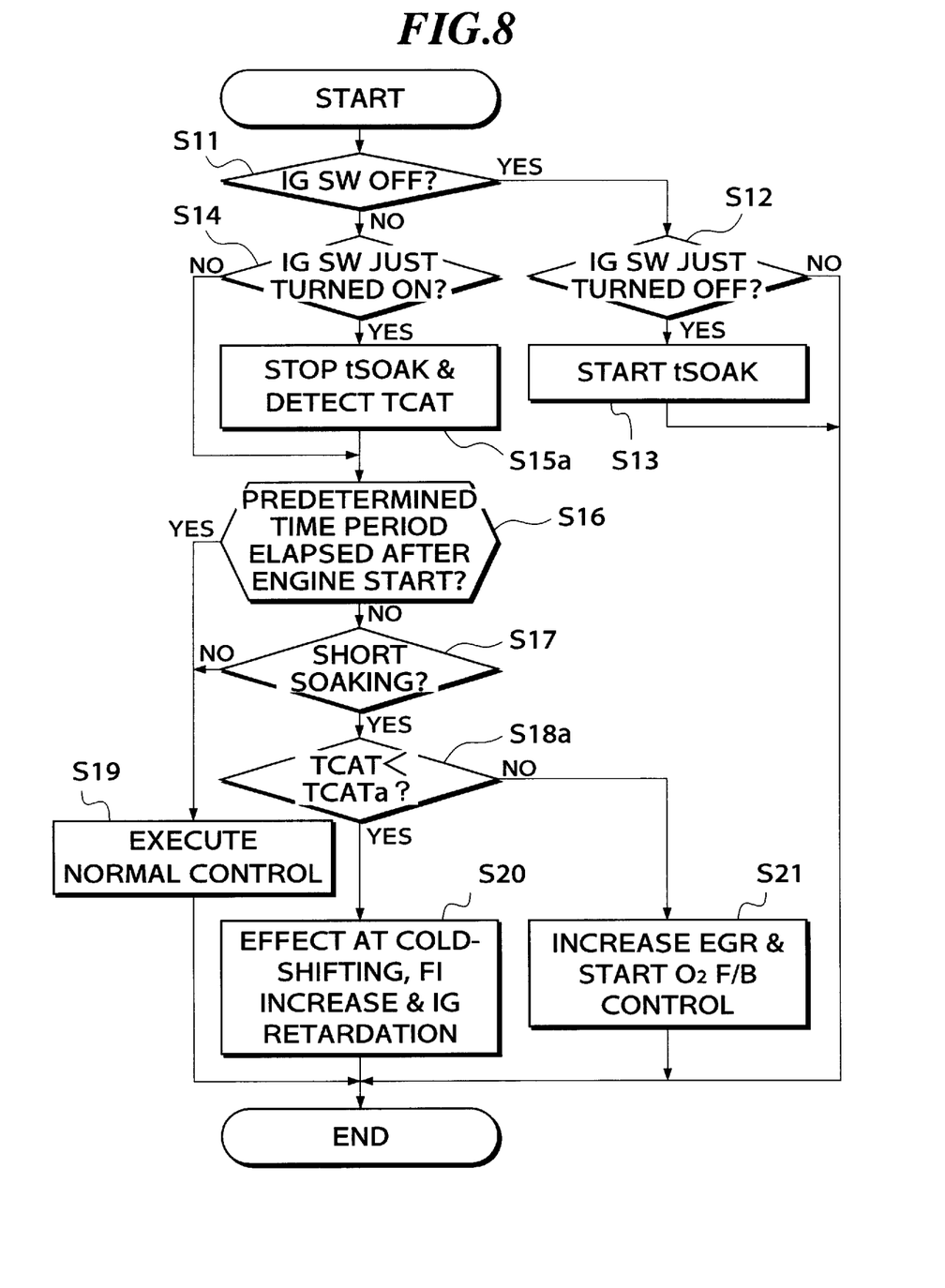
FIG. 8 is a flowchart showing a variation of the FIG. 6 program.

FIG. 8 shows a variation of the FIG. 6 program. According to the present variation, the catalyst temperature sensor 36 is utilized for executing a step S15a, and the thus detected temperature TCAT is employed at a step S18a, in place of the estimated temperature TCATE, wherein the detected temperature TCAT is compared with the predetermined value TCATa. Steps other than those mentioned above are identical with the corresponding steps in FIG. 6, and description thereof is omitted.

More specifically, immediately after turning-on of the ignition switch, the timer tSOAK is stopped, and at the same time the catalyst temperature TCAT is detected at the step S15a. Further, at the step S18a, it is determined whether or not the catalyst temperature TCAT is lower than the predetermined value TCATa, and if TCAT<TCATa holds, the program proceeds to the step S20. On the other hand, if TCAT≧TCATa holds, the program proceeds to the step S21.

According to the variation, the temperature TCAT of the three-way catalyst 15 is actually detected, and as a result it can be more accurately determined whether or not cold shifting of the transmission should be carried out.

Figure 9:
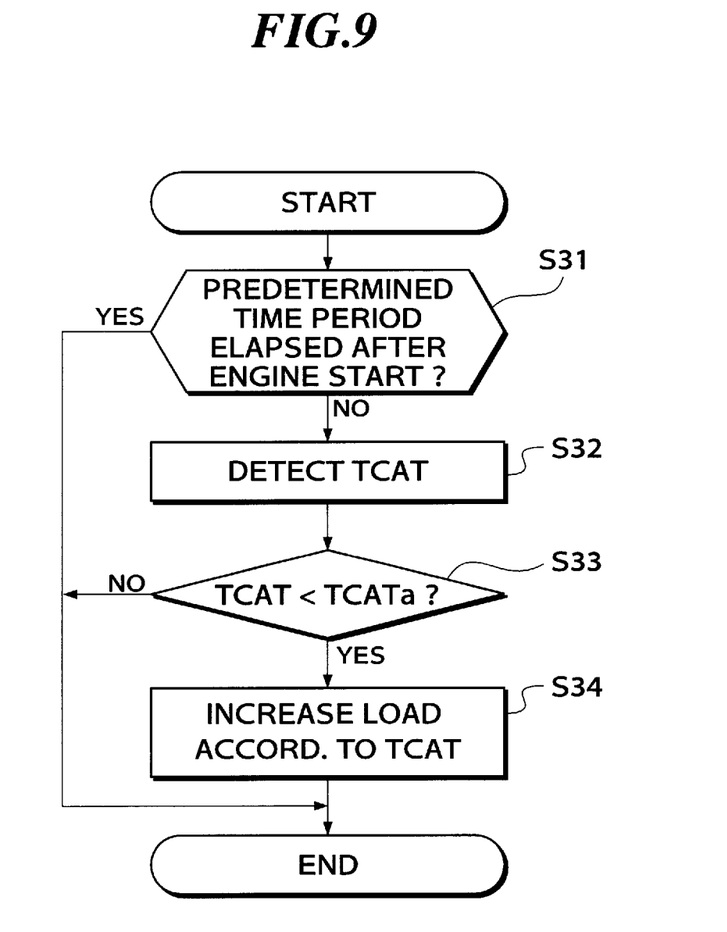
FIG. 9 is a flowchart showing a program for controlling an internal combustion engine, according to a third embodiment of the invention.

FIG. 9 shows a program for carrying out a control processing according to a third embodiment of the invention. In the present embodiment, a load on the engine applied by the air conditioner 37 or the like is controlled according to the catalyst temperature TCAT. Except for this, the present embodiment is identical in construction with the first embodiment.

First, at a step S31, it is determined whether or not a predetermined time period has elapsed after the start of the engine. If the predetermined time period has not yet elapsed, the catalyst temperature TCAT is detected. The catalyst temperature TCAT is detected by the catalyst temperature sensor 36 as in the second embodiment. Alternatively, the temperature of the O2 sensor 14 or the temperature of exhaust gases may be detected, and the temperature of the catalyst 15 may be estimated based on the detected temperature of the O2 sensor 14 or exhaust gases. Further, the internal resistance of a sensor element of the O2 sensor 14, which shows a tendency of decreasing as the temperature of the O2 sensor increases, may be detected for estimating the catalyst temperature TCAT from the detected internal resistance. Still further, an estimated catalyst temperature map based on the intake air temperature TW and the engine coolant temperature TW may be prepared, from which the catalyst temperature TCAT may be estimated according to the detected intake air temperature TA and the detected engine coolant temperature TW. Needless to say, the catalyst temperature TCAT may be estimated according to the soaking time period as in the first embodiment.

At the following step S33, it is determined whether or not the detected catalyst temperature is lower than the predetermined value TCATa. If the former is lower than the latter, a load on the engine 1 is increased at a step S34.

On the other hand, if the predetermined time period has elapsed after the start of the engine or the detected catalyst temperature is higher than the predetermined value TCATa, the program jumps over the step S34, followed by terminating the present routine.

The increase of load on the engine 1 executed at the step S34 is carried out, for example, by increasing the amount of circulation of a refrigerant in the air conditioner to increase a load applied by a compressor of the same on the engine, or by increasing the rotational speed of a blower fan of the air conditioner, when the air conditioner is operating. Alternatively, the load on the engine may be increased by setting regulation voltage of an AC generator driven by the engine 1 to a higher value, e.g. 16 V, than a normal value, e.g. 14.4V. By taking any of the measures to increase the load on the engine, the intake air amount is increased to quicken the elevation of the three-way catalyst temperature, to thereby improve exhaust emission characteristics of the engine 1.

As described hereinabove, according to the invention, when the engine is restarted after stoppage thereof over a short time period, the temperature of catalyst means arranged in the exhaust system of the engine is determined by estimation or detection, and at least one control parameter for operation of the engine and/or the vehicle after the restart of the engine is changed based on the determined catalyst temperature. As a result, elevation of the temperature of the catalyst means is quickened, to thereby improve exhaust emission characteristics of the engine.

What is claimed is:

1. A control system for a vehicle having a plurality of driving wheels, an internal combustion engine installed therein, and transmission means for transmitting a driving force of said engine to said driving wheels, said engine having an exhaust system, and catalyst means arranged in said exhaust system, for purifying exhaust gases emitted from said engine, said control system comprising:

control means for controlling at least one of operation of said engine and operation of said transmission means, based on at least one predetermined control parameter;

catalyst temperature state-detecting means for detecting a temperature state of said catalyst means at start of said engine; and control parameter-changing means for changing said at least one predetermined control parameter, based on said catalyst temperature state detected by said catalyst temperature state-detecting means, after said start of said engine, wherein said catalyst temperature state-detecting means includes soaking time-measuring means for measuring a time period elapsed from stoppage of said engine to next start of said engine;

said control parameter-changing means including ignition timing control means for retarding ignition timing of said engine according to the time period measured by said soaking time-measuring means;

said ignition timing control means increasing a retarding amount as the time period measured by said soaking time-measuring means increases, if the time period measured by said soaking time-measuring means is equal to or less than a predetermined time period, and holding the retarding amount at a value set when the time period measured by said soaking time-measuring means is equal to said predetermined time period, if the time period measured by said soaking time-measuring means is more than said predetermined time period.

2. A control system as claimed in claim 1, wherein said catalyst temperature state-detecting means includes catalyst temperature-estimating means for estimating temperature of said catalyst means, based on said time period measured by said soaking time-measuring means.

3. A control system as claimed in claim 1, wherein said catalyst temperature state-detecting means includes catalyst temperature-detecting means provided in said catalyst means, for detecting temperature of said catalyst means.

4. A control system as claimed in claim 1, wherein said control parameter-changing means includes idling rotational speed control means for increasing idling rotational speed of said engine according to said temperature state of said catalyst means detected by said catalyst temperature state-detecting means.

5. A control system as claimed in claim 1, wherein said control parameter-changing means includes transmission control means for increasing a shifting point of said transmission means according to said temperature state of said catalyst means detected by said catalyst temperature state-detecting means.

* * * * *